US012712397B2

(12) United States Patent
Bodurka

(10) Patent No.: US 12,712,397 B2
(45) Date of Patent: Aug. 18, 2026

(54) DOORS AND SYSTEMS FOR CONTROL OF INTERNET OF THINGS (IOT) DEVICES AND METHODS THEREOF

(71) Applicant: Masonite Corporation, Tampa, FL (US)

(72) Inventor: Alex Bodurka, Portage, MI (US)

(73) Assignee: Masonite Corporation, Tampa, FL (US)

(*) Notice: Subject to any disclaimer, the term of this patent is extended or adjusted under 35 U.S.C. 154(b) by 59 days.

(21) Appl. No.: 18/091,869

(22) Filed: Dec. 30, 2022

(65) Prior Publication Data

US 2023/0216355 A1 Jul. 6, 2023

Related U.S. Application Data

(60) Provisional application No. 63/294,938, filed on Dec. 30, 2021.

(51) Int. Cl.

*H02J 50/80* (2016.01)
*E06B 7/28* (2006.01)
*H02J 50/00* (2016.01)
*H02J 50/10* (2016.01)
*H02J 50/20* (2016.01)

(52) U.S. Cl.

CPC ................ *H02J 50/80* (2016.02); *E06B 7/28* (2013.01); *H02J 50/005* (2020.01); *H02J 50/10* (2016.02); *H02J 50/20* (2016.02)

(58) Field of Classification Search

CPC .. E05B 17/22; E05B 47/00; E05B 2047/0014; E05B 2047/0059; E05B 2047/0061; E05D 11/0081; E06B 7/00; E06B 7/28; H02J 50/005; H02J 50/10; H02J 50/12; H02J 50/20; H02J 50/80

See application file for complete search history.

(56) References Cited

U.S. PATENT DOCUMENTS

| | | | | |
|---|---|---|---|---|
| 8,193,764 | B2 | 6/2012 | Jakubowski | |
| 8,294,302 | B2 | 10/2012 | Peabody et al. | |
| 9,143,000 | B2 | 9/2015 | Leabman et al. | |
| 9,290,966 | B2 | 3/2016 | Hanchett, Jr. | |
| 10,643,412 | B1 * | 5/2020 | Yang | H04N 7/183 |
| 11,373,471 | B2 | 6/2022 | Anderson et al. | |
| 11,739,583 | B2 | 8/2023 | Sorice et al. | |
| 12,141,130 | B2 | 11/2024 | Gong et al. | |

(Continued)

FOREIGN PATENT DOCUMENTS

| | | |
|---|---|---|
| CN | 200968110 Y | 10/2007 |
| CN | 203925102 U | 11/2014 |

(Continued)

OTHER PUBLICATIONS

International Search Report and Written Opinion for Application No. PCT/US22/54365 mailed Apr. 24, 2023, 15 pp.

(Continued)

*Primary Examiner* — Levi Gannon

(74) *Attorney, Agent, or Firm* — IceMiller LLP

(57) ABSTRACT

The present disclosure provides a door or door system, including one or more doors configured with wireless power transfer system transmitters and/or receivers to power smart doors and/or peripheral wirelessly powered devices and, optionally, wireless data transmitters and/or receivers.

31 Claims, 11 Drawing Sheets

(56) References Cited

U.S. PATENT DOCUMENTS

| | | | | |
|---|---|---|---|---|
| 2011/0056252 | A1 | 3/2011 | Simpson | |
| 2014/0347153 | A1 | 11/2014 | Moon | |
| 2014/0347163 | A1 | 11/2014 | Banter et al. | |
| 2015/0371469 | A1* | 12/2015 | Scalisi | G07C 9/257 340/5.52 |
| 2016/0017640 | A1 | 1/2016 | Soloway et al. | |
| 2017/0051530 | A1* | 2/2017 | Colman | E05B 17/22 |
| 2017/0358952 | A1 | 12/2017 | Butler et al. | |
| 2018/0114389 | A1* | 4/2018 | Geiszler | G07C 9/00309 |
| 2019/0066413 | A1 | 2/2019 | McLeod et al. | |
| 2019/0188936 | A1* | 6/2019 | Sivill | E05F 17/00 |
| 2019/0257142 | A1 | 8/2019 | Koehl et al. | |
| 2020/0071991 | A1 | 3/2020 | Patel | |
| 2020/0295598 | A1* | 9/2020 | Zeine | H02J 50/005 |
| 2021/0052757 | A1* | 2/2021 | Baarman | A61L 2/24 |
| 2021/0183278 | A1 | 6/2021 | Lai | |
| 2022/0417630 | A1* | 12/2022 | Beltran | H03F 3/183 |
| 2023/0087532 | A1 | 3/2023 | Bodurka | |
| 2023/0141568 | A1 | 5/2023 | Sivasankaran et al. | |
| 2023/0216355 | A1 | 7/2023 | Bodurka | |
| 2024/0146046 | A1 | 5/2024 | Gong et al. | |
| 2024/0191556 | A1 | 6/2024 | Bodurka | |
| 2024/0191565 | A1 | 6/2024 | Bodurka | |
| 2024/0195232 | A1 | 6/2024 | Bodurka | |

FOREIGN PATENT DOCUMENTS

| | | | |
|---|---|---|---|
| CN | 205117039 | U | 3/2016 |
| CN | 206309153 | U | 7/2017 |
| CN | 206329255 | U | 7/2017 |
| CN | 107575137 | A | 1/2018 |
| CN | 107610390 | A | 1/2018 |
| CN | 206903524 | U | 1/2018 |
| CN | 107705511 | A | 2/2018 |
| CN | 107795255 | A | 3/2018 |
| CN | 207458156 | U | 6/2018 |
| CN | 208777869 | U | 4/2019 |
| CN | 209429913 | U | 9/2019 |
| CN | 110505182 | A | 11/2019 |
| CN | 209990389 | U | 1/2020 |
| CN | 211038390 | U | 7/2020 |
| CN | 211124167 | U | 7/2020 |
| CN | 211851423 | U | 11/2020 |
| CN | 112330869 | A | 2/2021 |
| CN | 112491668 | A | 3/2021 |
| CN | 112539020 | A | 3/2021 |
| CN | 213205374 | U | 5/2021 |
| CN | 112901047 | A | 6/2021 |
| CN | 113048374 | A | 6/2021 |
| CN | 113129476 | A | 7/2021 |
| CN | 113338772 | A | 9/2021 |
| CN | 113345130 | A | 9/2021 |
| CN | 113545639 | A | 10/2021 |
| CN | 113645446 | A | 11/2021 |
| CN | 113674454 | A | 11/2021 |
| CN | 113706744 | A | 11/2021 |
| CN | 214835862 | U | 11/2021 |
| CN | 214886488 | U | 11/2021 |
| CN | 214943492 | U | 11/2021 |
| CN | 215169563 | U | 12/2021 |
| CN | 113947834 | A | 1/2022 |
| CN | 217240775 | U | 8/2022 |
| CN | 217307315 | U | 8/2022 |
| CN | 115095246 | A | 9/2022 |
| CN | 115164381 | A | 10/2022 |
| CN | 115235096 | A | 10/2022 |
| CN | 115294675 | A | 11/2022 |
| CN | 115324428 | A | 11/2022 |
| CN | 115341821 | A | 11/2022 |
| CN | 115393988 | A | 11/2022 |
| CN | 218454661 | U | 2/2023 |
| CN | 115798084 | A | 3/2023 |
| CN | 116251221 | A | 6/2023 |
| CN | 219197192 | U | 6/2023 |
| CN | 219246122 | U | 6/2023 |
| CN | 116498183 | A | 7/2023 |
| CN | 116760602 | A | 9/2023 |
| CN | 117238059 | A | 12/2023 |
| DE | 202022101334 | U1 | 5/2022 |
| EP | 3118405 | A1 | 1/2017 |
| EP | 3537398 | A1 | 9/2019 |
| EP | 3845729 | A1 | 7/2021 |
| FR | 3132160 | A3 | 7/2023 |
| IN | 201921017138 | A | 5/2019 |
| IN | 201911049967 | A | 12/2019 |
| IN | 201911048995 | A | 5/2021 |
| IN | 202111053824 | A | 12/2021 |
| IN | 202241020116 | A | 4/2022 |
| IN | 202241026843 | A | 5/2022 |
| IN | 411059 | B | 11/2022 |
| IN | 202111013824 | A | 12/2022 |
| IN | 430120 | B | 4/2023 |
| IN | 202341019331 | A | 4/2023 |
| JP | 6680821 | B2 | 3/2020 |
| JP | 2020042440 | A | 3/2020 |
| JP | 6777955 | B2 | 10/2020 |
| KR | 20160025226 | A | 3/2016 |
| KR | 20160050965 | A | 5/2016 |
| KR | 20160123639 | A | 10/2016 |
| KR | 20160124481 | A | 10/2016 |
| KR | 101800514 | B1 | 12/2017 |
| KR | 20180076537 | A | 7/2018 |
| KR | 20180131716 | A | 12/2018 |
| KR | 101988851 | B1 | 6/2019 |
| KR | 20190098719 | A | 8/2019 |
| KR | 20190098720 | A | 8/2019 |
| KR | 102024754 | B1 | 9/2019 |
| KR | 102079532 | B1 | 2/2020 |
| KR | 102150642 | B1 | 9/2020 |
| KR | 20200143302 | A | 12/2020 |
| KR | 20210004253 | A | 1/2021 |
| KR | 20210016726 | A | 2/2021 |
| KR | 20210019211 | A | 2/2021 |
| KR | 20210019216 | A | 2/2021 |
| KR | 20210019218 | A | 2/2021 |
| KR | 20210019241 | A | 2/2021 |
| KR | 20210045195 | A | 4/2021 |
| KR | 20210072510 | A | 6/2021 |
| KR | 20210078199 | A | 6/2021 |
| KR | 102303254 | B1 | 9/2021 |
| KR | 102329035 | B1 | 11/2021 |
| KR | 102341883 | B1 | 12/2021 |
| KR | 20210153308 | A | 12/2021 |
| KR | 20220031428 | A | 3/2022 |
| KR | 102421708 | B1 | 7/2022 |
| KR | 20220113136 | A | 8/2022 |
| KR | 20220119878 | A | 8/2022 |
| KR | 102472384 | B1 | 12/2022 |
| KR | 102534826 | B1 | 5/2023 |
| TW | M627626 | U | 6/2022 |
| WO | 2013163124 | A1 | 10/2013 |
| WO | 2016032464 | A1 | 3/2016 |
| WO | 2016164851 | A1 | 10/2016 |
| WO | 2016175910 | A1 | 11/2016 |
| WO | 2017024088 | A1 | 2/2017 |
| WO | 2018184450 | A1 | 10/2018 |
| WO | 2018184452 | A1 | 10/2018 |
| WO | 2018184453 | A1 | 10/2018 |
| WO | 2018184454 | A1 | 10/2018 |
| WO | 2019068021 | A1 | 4/2019 |
| WO | 2019162435 | A1 | 8/2019 |
| WO | 2020028881 | A1 | 2/2020 |
| WO | 2021044248 | A1 | 3/2021 |
| WO | 2022004989 | A1 | 1/2022 |
| WO | 2022010071 | A1 | 1/2022 |
| WO | 2022010072 | A1 | 1/2022 |
| WO | 2022010073 | A1 | 1/2022 |
| WO | 2022010074 | A1 | 1/2022 |
| WO | 2022020893 | A1 | 2/2022 |
| WO | 2022145966 | A1 | 7/2022 |

(56) References Cited

FOREIGN PATENT DOCUMENTS

| | | | |
|---|---|---|---|
| WO | 2022263147 | A1 | 12/2022 |
| WO | 2023180427 | A1 | 9/2023 |

OTHER PUBLICATIONS

International Search Report and Written Opinion Issued in International Application No. PCT/US2022/049152 mailed Feb. 8, 2023, 10 Pages.
Extended European Search Report issued in EP 22917383.5, dated Nov. 26, 2025 [9 pages].

* cited by examiner

DOORS AND SYSTEMS FOR CONTROL OF INTERNET OF THINGS (IOT) DEVICES AND METHODS THEREOF

CROSS-REFERENCE TO RELATED APPLICATIONS

This application claims the benefit of U.S. Provisional Application No. 63/294,938, filed Dec. 30, 2021, the disclosure of which is incorporated herein by reference in its entirety.

FIELD

The present disclosure is directed to exterior or interior doors and system of doors for residential or commercial buildings, such as for a home, apartment, condominium, hotel room or business. In particularly, the door or system of doors provides electrical power and control for electrical devices are connected to the door or system of doors via a network. The invention is also directed to methods of providing electrical power and control to electrical devices connected to a door or a system of doors, such electrical devices operable over a network, such as via Wi-Fi, Bluetooth, etc.

BACKGROUND

Typical existing exterior or interior doors for residential or commercial buildings may have one or more electric devices (or components) mounted to the doors in order to provide desired functions, such as electronic access control, door state feedback, an entry camera and audio communication, an electric powered door latch, an electric powered door lock, etc. Also, the market for exterior and interior doors has seen an increasing adoption of additional electric devices, including video doorbells, smart locks, LED lighting, smart glass, electromechanical door closers, wireless connectivity electronics, etc. Each of these discrete electric devices is an add-on to an existing door, functions with the existing door construction, and is powered separately with at least one battery that needs periodic replacement or recharging. Should the battery not be replaced or recharged, then the electric device will not operate.

Current electric devices are mounted to exterior or interior doors or hardwired thereto in a manner that can be unattractive and unpleasant to look at. They typically each have either one or more rechargeable battery packs or at least one non-rechargeable battery that must periodically be replaced or changed and have some type of weatherable housing.

The internet of things (IoT) is a system of interconnected devices that are connected over a network to transfer data without requiring human interaction. The devices may be computers, mechanical machines, digital machines, or electrical devices that can be assigned an internet protocol (IP) address and are able to transfer data over the network.

The present disclosure recognizes a need for a door or system of doors configured to communicate over a network for wirelessly providing reliable power and control to IoT devices that are connected to the network, such as lights, cameras, sensors, locks and the like.

SUMMARY

The techniques of the present disclosure relate to a door or system of doors configured with wireless power transfer system transmitters and/or receivers to power smart doors and/or peripheral wirelessly powered devices and, optionally, wireless data transmitters and/or receivers.

In exemplary aspects, the present disclosure describes at least a first door, that includes a first door slab, with front and back door skins or facings attached to or part of a door frame, at least one hinge or hanging rail attachment, and a wireless power transfer system (WPTS) transmitter configured to wirelessly transmit power from a WPTS power source. In exemplary aspects, a system also includes at least a second door, including a door slab, with front and back door skins or facings attached to or part of a door frame, at least one hinge or hanging rail attachment, and a wireless power transfer system (WPTS) receiver configured to wirelessly receive power from the WPTS transmitter of the first door.

Exemplary aspects provide for various configurations for wireless power (and optionally data) transfer between doors or IOT devices, with at least one door acting as a repeater or transmitter. A door may also act as a gateway; or an externally electrically connected device may provide initial WPTS transmission and/or data connectivity (e.g., Internet connectivity).

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

The accompanying drawings are incorporated in and constitute a part of the specification. The drawings, together with the general description given above and the detailed description of the exemplary embodiments and methods given below, provide details of exemplary embodiments within the present disclosure. In such drawings.

DETAILED DESCRIPTION OF THE PREFERRED EMBODIMENT(S)

Figure 1:
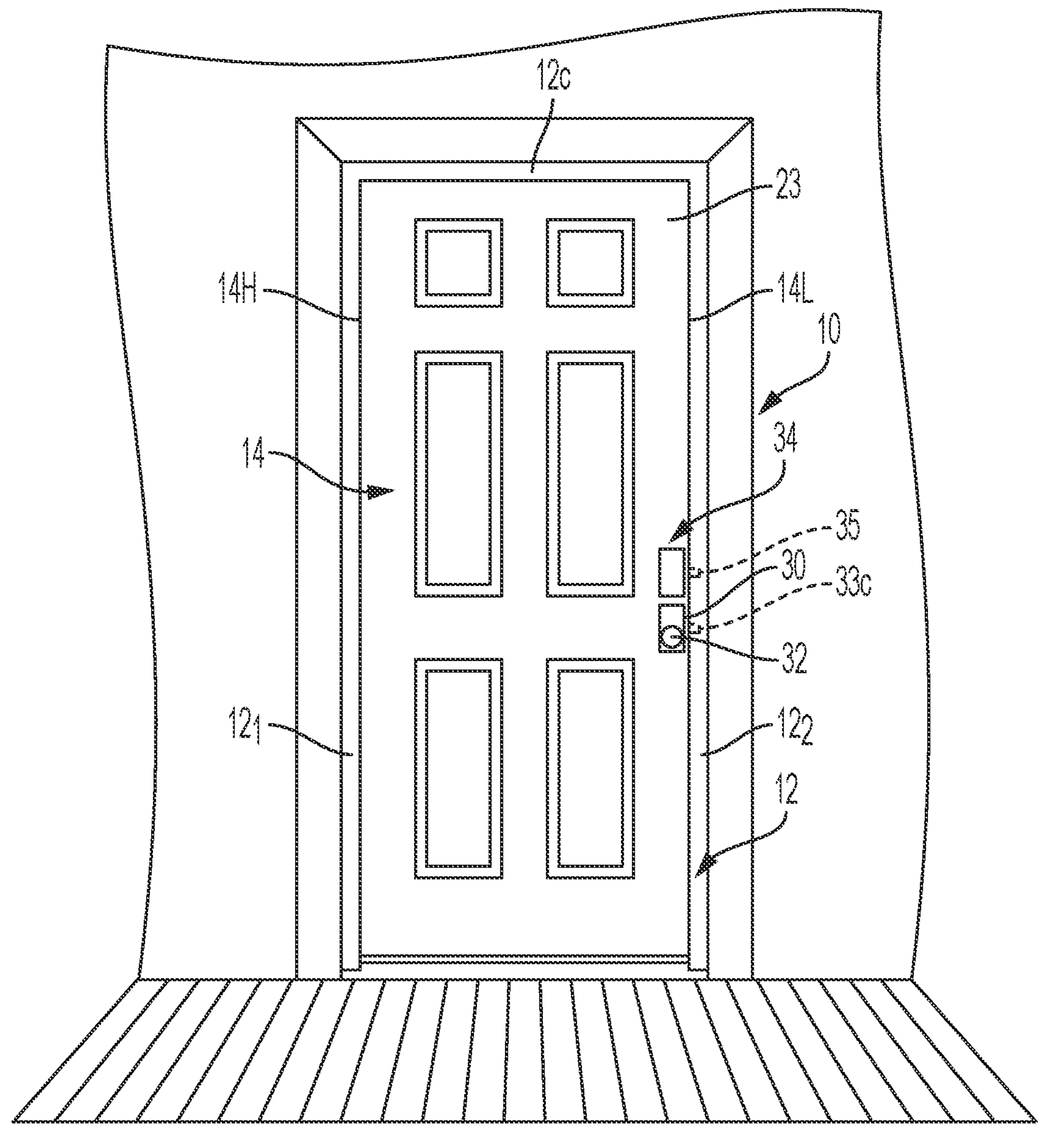
FIG. 1 is an elevational exterior view of an exemplary door system according to exemplary embodiments of the present disclosure.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixed (i.e., non-moveable) and connected together. Additionally, the word "a" and "an" as used in the claims means "at least one" and the word "two" as used in the claims means "at least two".

Figure 2:
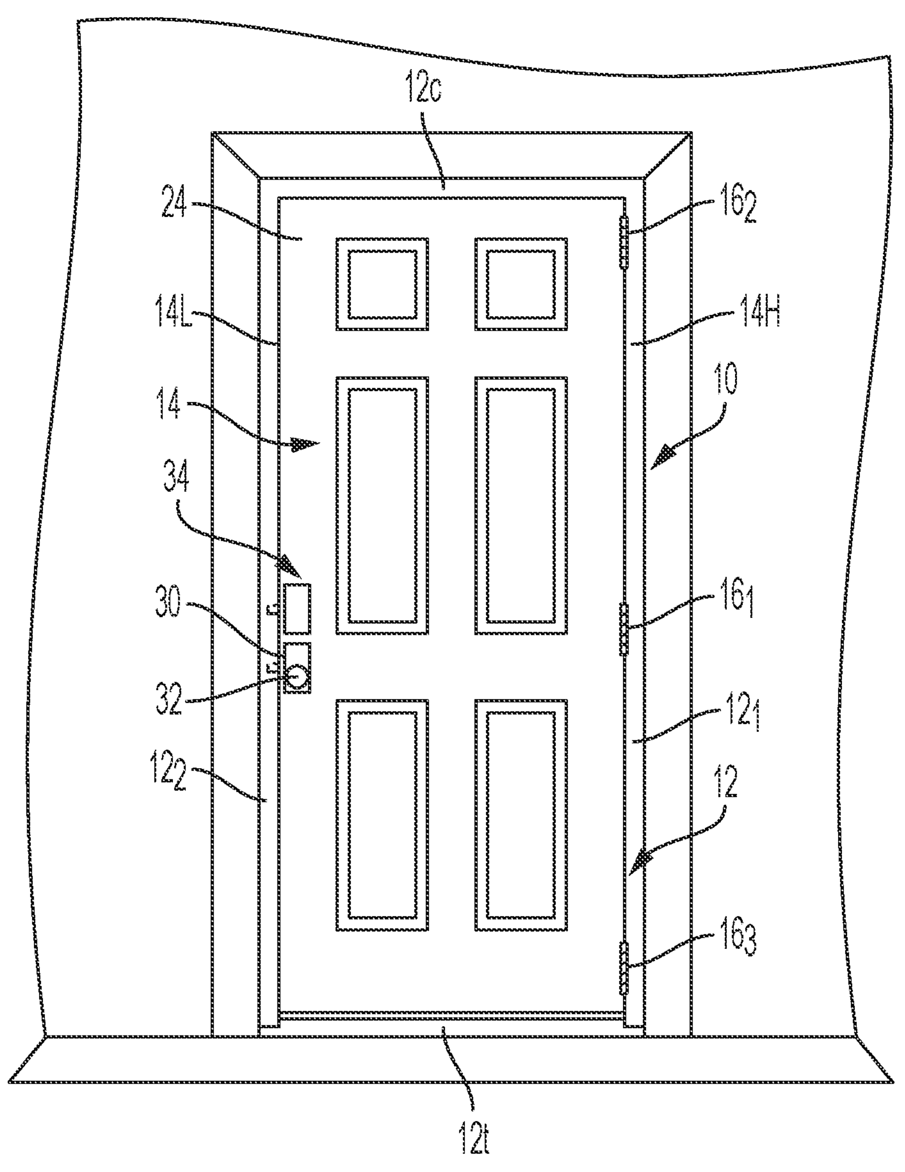
FIG. 2 is an elevational interior view of the door system.

FIGS. 1 and 2 illustrate a door system 10 according to an exemplary embodiment of the present disclosure, such as a pre-hung door. In exemplary embodiments, the door system 10 includes a conventional hinged residential interior door assembly 11, but it should be understood that the door assembly 11 may be a pivotally mounted exterior or interior door assembly provided for a residential or commercial building, such as a home, apartment, garage, condominium, hotel, office building, or the like. The door assembly 11 may be made of any appropriate material, such as wood, metal, wood composite material, fiberglass reinforced polymer composite, or the like. The door assembly 11 includes, in exemplary embodiments, a substantially rectangular door frame 12 and a door 14 pivotally attached thereto by at least one hinge $\mathbf{16}_1$, such as a "butt hinge" that includes two leaves. In exemplary embodiments, the door system 10 is a powered door system, such as is disclosed in co-pending U.S. patent application Ser. No. 17/142,759, the entire disclosure of which is incorporated by reference herein.

In exemplary embodiments, the frame assembly 12 includes first and second parallel, spaced apart vertically extending jamb members $\mathbf{12}_1$, $\mathbf{12}_2$ and a horizontally extending upper jamb rail member or header 12*c* that connects upper ends of the first and second jamb members $\mathbf{12}_1$, $\mathbf{12}_2$. Those skilled in the art recognize that lower ends of the jamb members $\mathbf{12}_1$, $\mathbf{12}_2$ may be interconnected through a threshold $\mathbf{12}_T$.

In further exemplary aspects, the at least one hinge $\mathbf{16}_1$ pivotally attaches the door 14 to the first jamb member $\mathbf{12}_1$. Typically, at least two hinges $\mathbf{16}_1$ and $\mathbf{16}_2$ are provided to secure the door 14 to the first jamb member $\mathbf{12}_1$. In exemplary embodiments, as best shown in FIG. 2, three hinges $\mathbf{16}_1$, $\mathbf{16}_2$, $\mathbf{16}_3$ are used to secure the door 14 to the frame assembly 12. In the interest of simplicity, the following discussion will sometimes use a reference numeral 16 without a subscript numeral to designate an entire group of hinges. For example, the reference numeral 16 will be sometimes used when generically referring to the hinges $\mathbf{16}_1$, $\mathbf{16}_2$ and $\mathbf{16}_3$.

The illustrated door 14 includes a rectangular inner door frame 20, an exterior door skin (or facing) 23, and an interior door skin (or facing) 24 secured to opposite sides of the inner door frame 20. As used herein "exterior" indicates the side of the door that faces away from a room or house; and "interior" indicates the side of the door 14 that faces the interior of a room or house. The exterior and interior door skins 23 and 24 are formed separately from one another, and typically are identical in appearance. The door skins 23 and 24 are secured, e.g., typically adhesively, to a suitable core and/or to opposite sides of the inner door frame 20 so that the inner door frame 20 is sandwiched between the exterior and interior door skins 23 and 24. In exemplary embodiments, the exterior and interior door skins 23 and 24 are made of a polymer-based composite, such as sheet molding compound ("SMC") or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The illustrated inner door frame 20 includes a pair of parallel, spaced apart horizontally extending top and bottom rails $\mathbf{21}_1$ and $\mathbf{21}_2$, respectively, and a pair of parallel, spaced apart vertically extending first and second stiles $\mathbf{22}_1$ and $\mathbf{22}_2$, respectively, typically manufactured from wood or an engineered wood, such as a laminated veneer lumber (LVL). The top and bottom rails $\mathbf{21}_1$ and $\mathbf{21}_2$ horizontally extend between the first and second stiles $\mathbf{22}_1$ and $\mathbf{22}_2$. Moreover, the top and bottom rails $\mathbf{21}_1$ and $\mathbf{21}_2$ may be fixedly secured to the first and second stiles $\mathbf{22}_1$ and $\mathbf{22}_2$, such as through adhesive or mechanical fasteners. The inner door frame 20 further may include a mid-rail $\mathbf{21}_3$, best shown in FIGS. 3-5. The mid-rail $\mathbf{21}_3$ extends horizontally and is spaced apart from the top and bottom rails $\mathbf{21}_1$ and $\mathbf{21}_2$, respectively, and is typically also manufactured from wood or an engineered wood, such as a laminated veneer lumber (LVL). Moreover, the mid-rail $\mathbf{21}_3$ may be fixedly secured to the first and second stiles $\mathbf{22}_1$ and $\mathbf{22}_2$. The hinges 16 are secured to the first stile $\mathbf{22}_1$, which defines a hinge stile of the inner door frame 20. The door 14 may also include a protective cap 19 made of composite material, best shown in FIG. 4. Specifically, the protective cap 19 can be made from polyvinyl chloride or other weatherable polymer. As further illustrated in FIGS. 3 and 4, the door 14 also includes a vertically extending inner stile $22_3$, which is adjacent and horizontally spaced from the second stile $22_2$ so as to define an open vertical channel 25 therebetween. The inner stile $22_3$ may also be manufactured from wood or an engineered wood, such as a laminated veneer lumber (LVL).

The illustrated inner door frame 20 and the exterior and interior door skins 23, 24 of a typical door surround an interior cavity, which may be hollow or may be filled with, for example, corrugated pads, foam insulation, or other core materials, if desired. Thus, the door 14 may include a core 15 disposed within the inner door frame 20 between the exterior and interior door skins 23 and 24. The core 15 may be formed from foam insulation, such as polyurethane foam material, cellulosic material and binder resin, corrugated pads, etc. The frame assembly 12 includes first and second parallel, spaced apart vertically extending jamb members $12_1$, $12_2$ and a horizontally extending upper jamb member or header 12*c* that connects upper ends of the first and second jamb members $12_1$, $12_2$. Those skilled in the art recognize that lower ends of the jamb members $12_1$, $12_2$ may be interconnected through a threshold $12_t$.

The illustrated at least one hinge $16_1$ pivotally attaches the door 14 to the first jamb member $12_1$. In exemplary embodiments, at least two hinges $16_1$ and $16_2$ are provided to secure the door 14 to the first jamb member $12_1$. Preferably, as best shown in FIG. 1, three hinges $16_1$, $16_2$, $16_3$ are used to secure the door 14 to the frame assembly 12. In the interest of simplicity, the following discussion will sometimes use a reference numeral 16 without a subscript numeral to designate an entire group of the hinges. For example, the reference numeral 16 will be sometimes used when generically referring to the hinges $16_1$, $16_2$ and $16_3$.

The illustrated door 14 includes a rectangular inner door frame 20, a first (or exterior) door skin (or facing) 23 and a second (or interior) door skin (or facing) 24 secured to opposite sides of the inner door frame 20. In further exemplary embodiments, the first and second door skins 23, 24 are formed separately from one another. The door skins 23, 24 are secured, e.g., typically adhesively, to a suitable core and/or to opposite sides of the inner door frame 20 so that the inner door frame 20 is sandwiched between the first and second door skins 23, 24. Typically, the first and second door skins 23, 24 are made of a polymer-based composite, such as sheet molding compound ("SMC") or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The inner door frame 20 includes a pair of parallel, spaced apart horizontally extending top and bottom rails $21_1$ and $21_2$, respectively, and a pair of parallel, spaced apart vertically extending first and second stiles $22_4$ and $22_2$, respectively, typically manufactured from wood or an engineered wood, such as a laminated veneer lumber (LVL). The top and bottom rails $21_1$ and $21_2$ horizontally extend between the first and second stiles $22_4$ and $22_2$. Moreover, the top and bottom rails $21_1$ and $21_2$ may be fixedly secured to the first and second stiles $22_4$ and $22_2$, such as through adhesive or mechanical fasteners. The inner door frame 20 further may include a mid-rail. The mid-rail extends horizontally and is spaced from the top and bottom rails $21_1$ and $21_2$, respectively, and is typically also manufactured from wood or an engineered wood, such as a laminated veneer lumber (LVL). Moreover, the mid-rail may be fixedly secured to the first and second stiles $22_1$ and $22_2$. The hinges 16 are secured to the first stile $22_1$, which defines a hinge stile of the inner door frame 20.

The inner door frame 20 and the first and second door skins 23, 24 of a typical door surround an interior cavity 15, which may be hollow or may be filled with, for example, corrugated pads, foam insulation, or other core materials, if desired. Thus, the door 14 may include a core disposed within the inner door frame 20 between the first and second door skins 23, 24. The core may be formed from foam insulation, such as polyurethane foam material, cellulosic material and binder resin, corrugated pads, etc. The first and second door skins 23, 24 may be identical in appearance and may be flat or flush or have one or more paneled portions.

Figure 4:
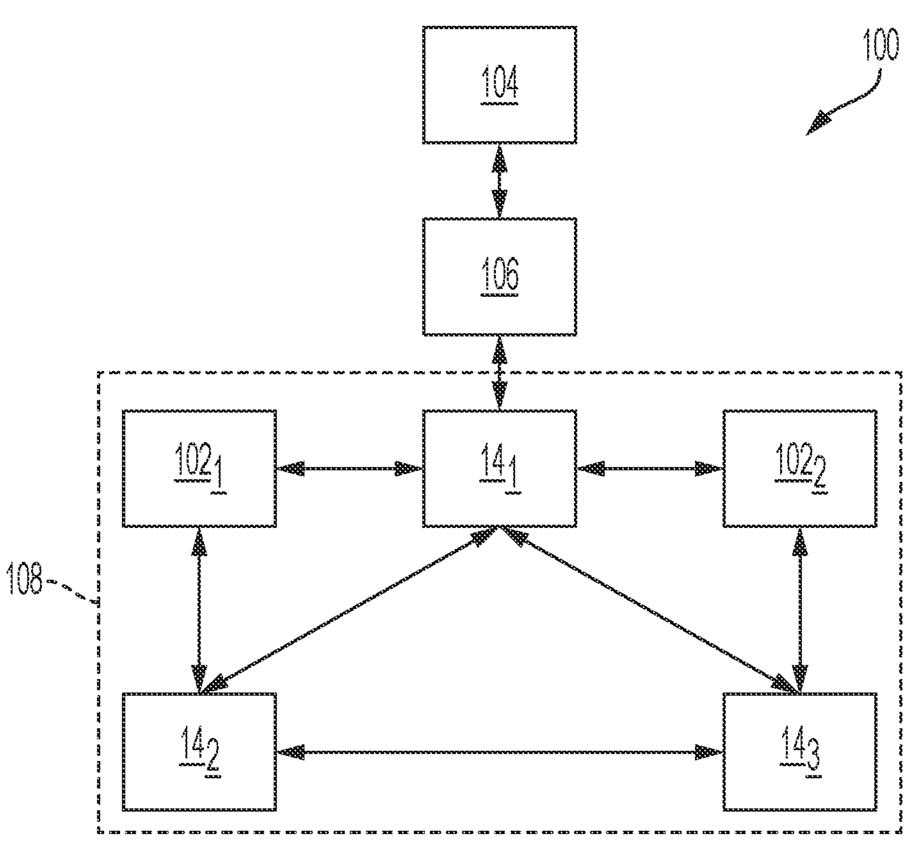
FIG. 4 is a flow diagram showing an exemplary network system according to exemplary embodiments of the present disclosure.

In exemplary embodiments described herein and referring to FIG. 4, one or several doors $14_1$, $14_2$, $14_3$, when installed in a residential or commercial building, may be connected and communicate with each other over a wireless network system 100. Herein, subscripts are used after reference numerals to show more than one of the same element. One of the doors $14_1$ is connected to the internet 106, such as through Wi-Fi or an ethernet connection and acts as an internet gateway, while e.g., other doors $14_2$, $14_3$ are not connected to the internet (though it is contemplated that they may be), but wirelessly communicate with each other and with door $14_1$ and act as repeaters within the network system 100. Hereafter, door $14_1$ is referred to as the gateway door and the other doors $14_2$, $14_3$ are referred to as the repeater doors (noting again that such "repeater doors" may also have internet connectivity of some sort). While FIG. 4 shows two repeater doors $14_2$, $14_3$ those skilled in the art will recognize, after reviewing the present specification, that there may be additional repeater doors. Additionally, there may be several doors that act as a gateway in a building, and in some cases all the doors may act as a gateway leaving none acting as a repeater.

The network system 100 may include one or more IoT electrical devices $102_1$, $102_2$ that are in wireless communication with one or more of the doors $14_1$, $14_2$, $14_3$. The IoT devices 102 may be lights (such as LED lights), sensors (such as smoke sensors or motion sensors), cameras, door operators to open/close the doors, locks, computers, televisions, audio/video equipment for tele conferencing, heating/air conditioner units, fans, air purifiers, etc. In exemplary aspects, the doors $14_1$, $14_2$, $14_3$ are configured to provide wireless power to, communicate with, and/or control the IoT devices 102. Without limitation, certain exemplary IoT devices may be provided at any location relative to the doors described herein, e.g., within one or more doors, as stand-alone devices, as part of other home or business devices, etc. Together, the gateway door $14_1$, repeater doors $14_2$, $14_3$, and the IoT devices $102_1$, $102_2$ form an IoT network 108. Although FIG. 4 shows three doors $14_1$, $14_2$, $14_3$ and two IoT devices $102_1$, $102_2$, any number of doors 14 and IoT devices 102 may reside on the network system 100. Importantly, the network system 100 has only a single gateway door $14_1$ and several repeater doors $14_2$, $14_3$, which allows the network system 100 to operate at lower cost and consume less energy.

In certain situations, e.g., when the building is large, walls (e.g., constructed of metal) impeding wireless communication or power transfer, many IoT devices are on the network system, or high latency in system, more than one gateway door $14_1$ may be used. Several factors can impact the decision to have multiple gateway doors $14_1$: number of devices connecting to each door, system latency, distance from door to door, physical mediums in between each door (e.g., metal walls). The network system 100 may also include a remote device 104 having a hardware and software platform for electronic communication with the gateway door $14_1$. The remote device 104 may be a smart phone, a smart watch, or a tablet that is associated with a user, such as a homeowner, building manager, system administrator, etc. As illustrated in FIG. 4, the remote device 104 may communicate wirelessly with the gateway door $14_1$ via the Internet 106. Although one remote device 104 is shown in FIG. 4, more than one device 104 may be used if more than one user is authorized. The authorized user may use the remote device 104 to configure the IoT network 108 with preferences, security features, etc.

The network system 100 includes the gateway door $14_1$, one or more repeater doors $14_2$, $14_3$, one or more IoT devices $100_1$, $100_2$, and one or more remote devices 104. The doors $14_1$, $14_2$, $14_3$ serve as sources of power and internet connectivity to IoT devices 100. Each of the doors $14_1$, $14_2$, $14_3$ is wired to the home/buildings mains power (120 VAC) and is connected to the internet 106, directly via ethernet or Wi-Fi (gateway door $14_1$) or indirectly (repeater doors $14_2$, $14_3$). The doors $14_1$, $14_2$, $14_3$ also have several radios for implementing various IoT protocols (such as Wi-Fi, matter, thread, Zigbee, Zwave, and Bluetooth). Because the network system 100 is connected to the cloud (i.e., Internet), a mobile app and/or web app present on the remote device 104 may be used to remotely control and configure the network system 100, and consequently the devices 102.

Multiple doors $14_1$, $14_2$, $14_3$ may be linked together over the network system 100, where one (or more) door $14_1$ can act as the gateway door (i.e., connected to the Internet) and the other doors $14_2$, $14_3$ only have radios for the network system 100 and thus act as IoT repeaters. When multiple doors are present, the IoT devices 102 can receive power and/or connectivity from any door. The door that provides the most efficient transfer of energy and/or connectivity can be used (usually the closest door without intervening interference). The IoT devices 102 can be manually configured to a specific room/area, thus still allowing the IoT devices 102 to be completely turned off/on when a particular room is not in use (thus need to turn all devices in that room off), while still allowing for optimal performance (i.e. energy transfer and connectivity) that may require the IoT device receiving power/connectivity from a door that is in an adjacent room.

Figure 5:
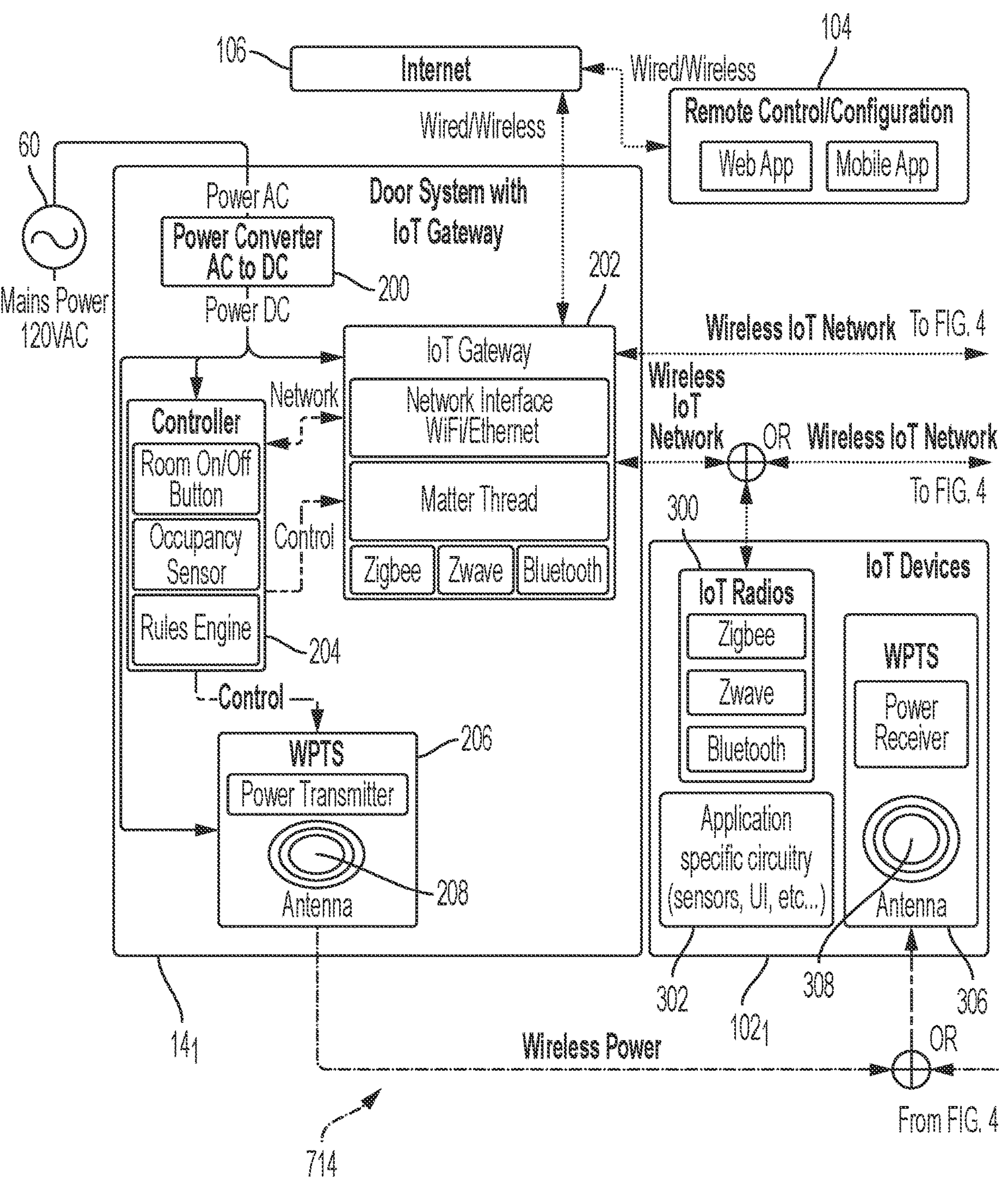
FIG. 5 is a flow diagram showing the details of the components of an exemplary gateway door and an exemplary IoT device and their communication pathways according to exemplary embodiments of the present disclosure.
Figure 6:
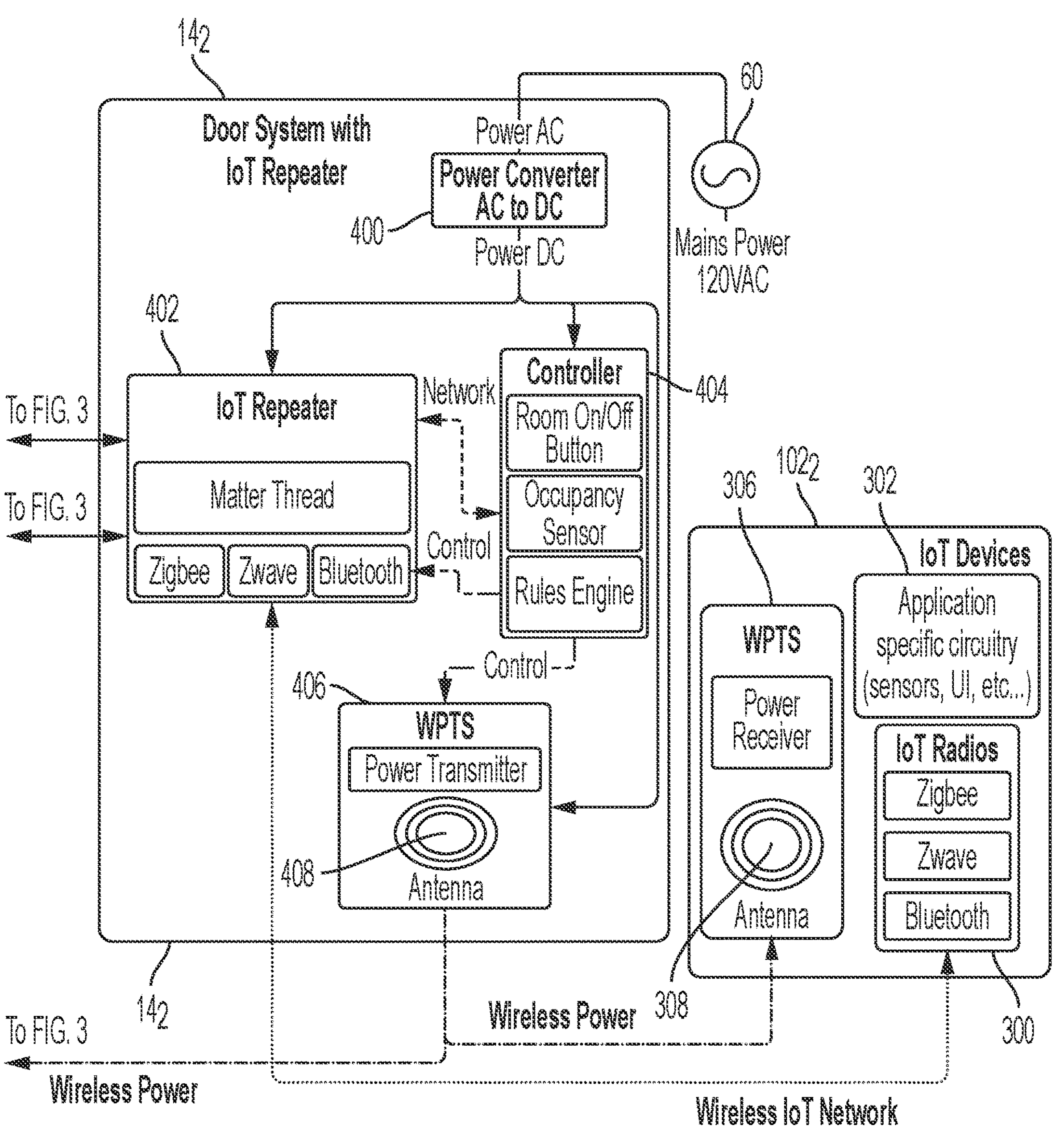
FIG. 6 is a continuation of FIG. 4 and shows the details of the components of the repeater door and the IoT device and their communication pathways.

FIGS. 5-6 show a schematic for the gateway door $14_1$, repeater door $14_2$ or $14_3$, and IoT devices $102_1$, $102_2$. As shown in FIG. 5, the gateway door $14_1$ includes the following components: an AC to DC power converter 200, an IoT gateway 202, a controller 204, and a wireless power transfer system (WPTS) transmitter 206. The components may be located, partially or wholly, within the interior cavity 15 of the door $14_1$, door jamb 12, or connected thereto. In other exemplary embodiments, a WPTS transmitter is provided as a plug-in device (e.g., provided as a 120V plug in module) in a wireless power/communicative proximity to the gateway door, with wireless power provided from the external WPTS transmitter to the door (via a WPTS receiver 306 mounted in the door). Exemplary plug-in devices include those configured to plug into wall outlets, ceiling light fixtures, free standing light or other fixtures, powered tracks, etc. Further, data communication (e.g., Internet connectivity can be via the plug-in device in addition to, or in the alternative to, the gateway door (in the latter case, rendering the gateway door akin to a repeater door)).

In exemplary embodiments, the AC to DC power converter 200 converts alternating current (AC) to direct current (DC) used by the components on the door $14_1$. The converter 200 is electrically connected to a high voltage AC (such as 110 (or 120) V AC) power source 60. The AC power source 60 may be a standard 120 (or 110) volts general-purpose AC electrical power supply known in the USA as grid power, wall power, or domestic power. Other voltages, such as 220 volts, may also be used. The converter 200 rectifies the AC power from the power source 60 to DC for use by the IoT gateway 202, controller 204, and WPTS transmitter 206 as needed. Many IoT devices operate at 5 volts DC, and the converter 200 allows the appropriate power to be provided to and available for each of the devices.

The IoT gateway 202 bridges the IoT network 108 with the Internet 106 and communicates with the IoT devices 102 and the repeater door(s) $14_2$ and/or $14_3$. The IoT gateway 202 is connected to the internet by an ethernet connection (wired connection) or by Wi-Fi (wireless connection). The IoT gateway 202 is also connected to the repeater door(s) $14_2$ and/or $14_3$ wirelessly using standard IoT protocols, such as Wi-Fi, Matter, Thread, Zigbee, Zwave, Bluetooth, proprietary RF, or combinations thereof.

The controller 204 provides control logic to the WPTS transmitter 206 and the IoT gateway 202. In exemplary embodiments, the controller 204 provides two main controls. First, the controller 204 communicates with the remote device 104, via the Internet 106, to allow the user to switch on or off one or more of the IoT devices 102 by enabling or disabling the WPTS transmitter 206 to the one or more IoT devices 102. Second, the controller communicates with one or more occupancy sensors (located in/on the door system or remotely as one of the IoT devices 102) to automatically enable or disable the WPTS transmitter 206 to certain IoT devices 102 (e.g., IoT lights) to turn on or off those IoT devices. In this way, lights, etc. may be operated only when necessary and power saved when they are turned off when not needed. The rules for automatic activation/deactivation of the WPTS transmitter 206 may be preset by the user via the remote device 104 and saved to the cloud. The rules may be established when the remote device 104 initially is set up by the user.

The WPTS transmitter 206 may be used to wirelessly transmit electrical power to the IoT devices 102. Power is provided to the WPTS transmitter 206 by the converter 200. In general, as illustrated in FIG. 5, the WPTS includes the power transmitter 206, a transmitting antenna 208 operatively connected to the power transmitter 206, a WPTS receiver 306, and a receiving antenna 308 operatively connected to the WPTS receiver 306. As used herein, "antenna" may be a coil of wire which generates/receives a magnetic field, a metal plate which generates/receives an electric field, a metal rod which radiates/receives radio waves, or a laser which generates/receives light. The WPTS transmitter 206 and transmitting antenna 208 are located on the gateway door $14_1$ and repeater doors, while the WPTS receiver 306 and the receiving antenna 308 are located on the IoT devices 102.

Figure 7:
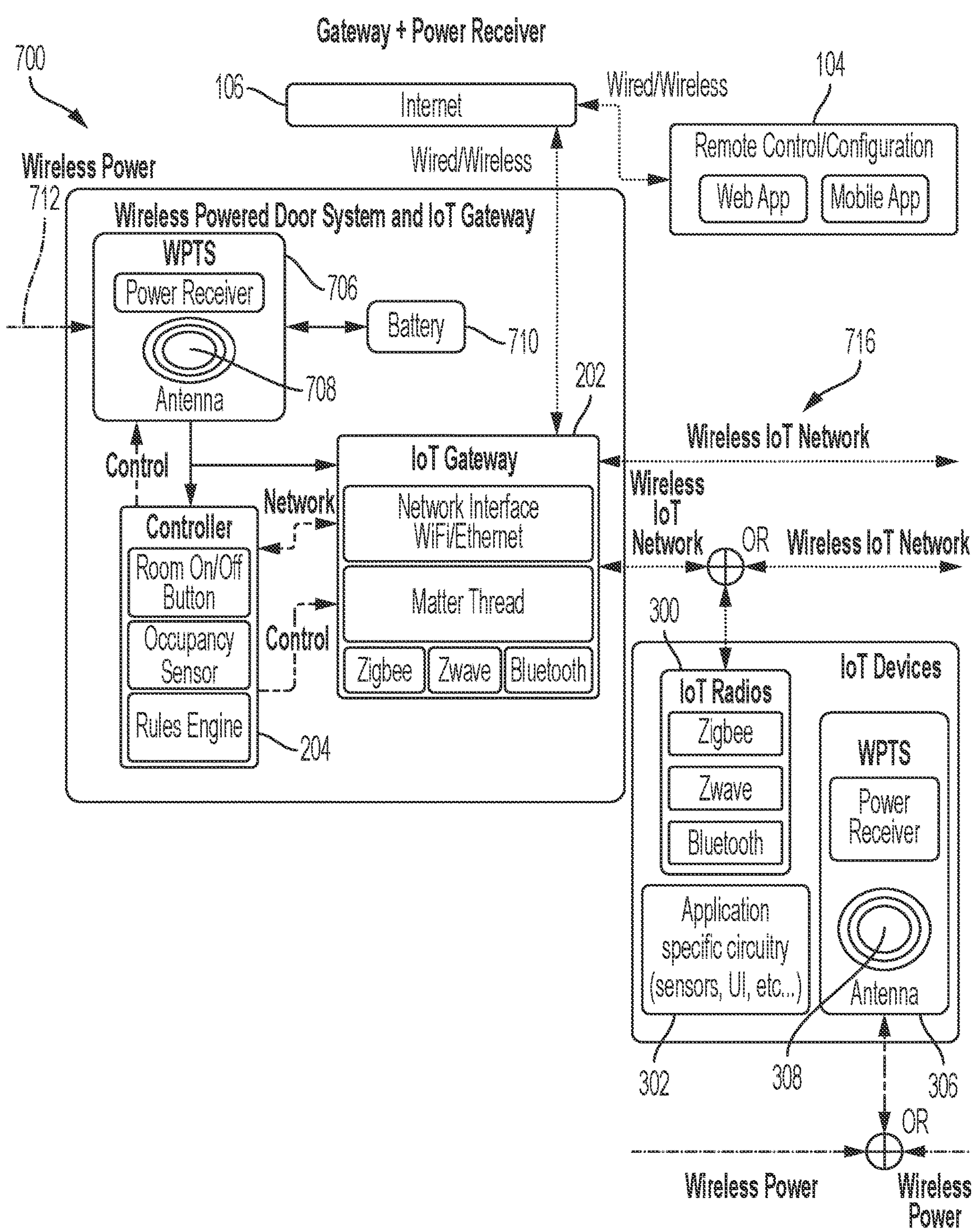
FIG. 7 is another flow diagram showing the details of the components of an exemplary gateway door and an exemplary IoT device and their communication and wireless power pathways according to exemplary embodiments of the present disclosure.
Figure 8:
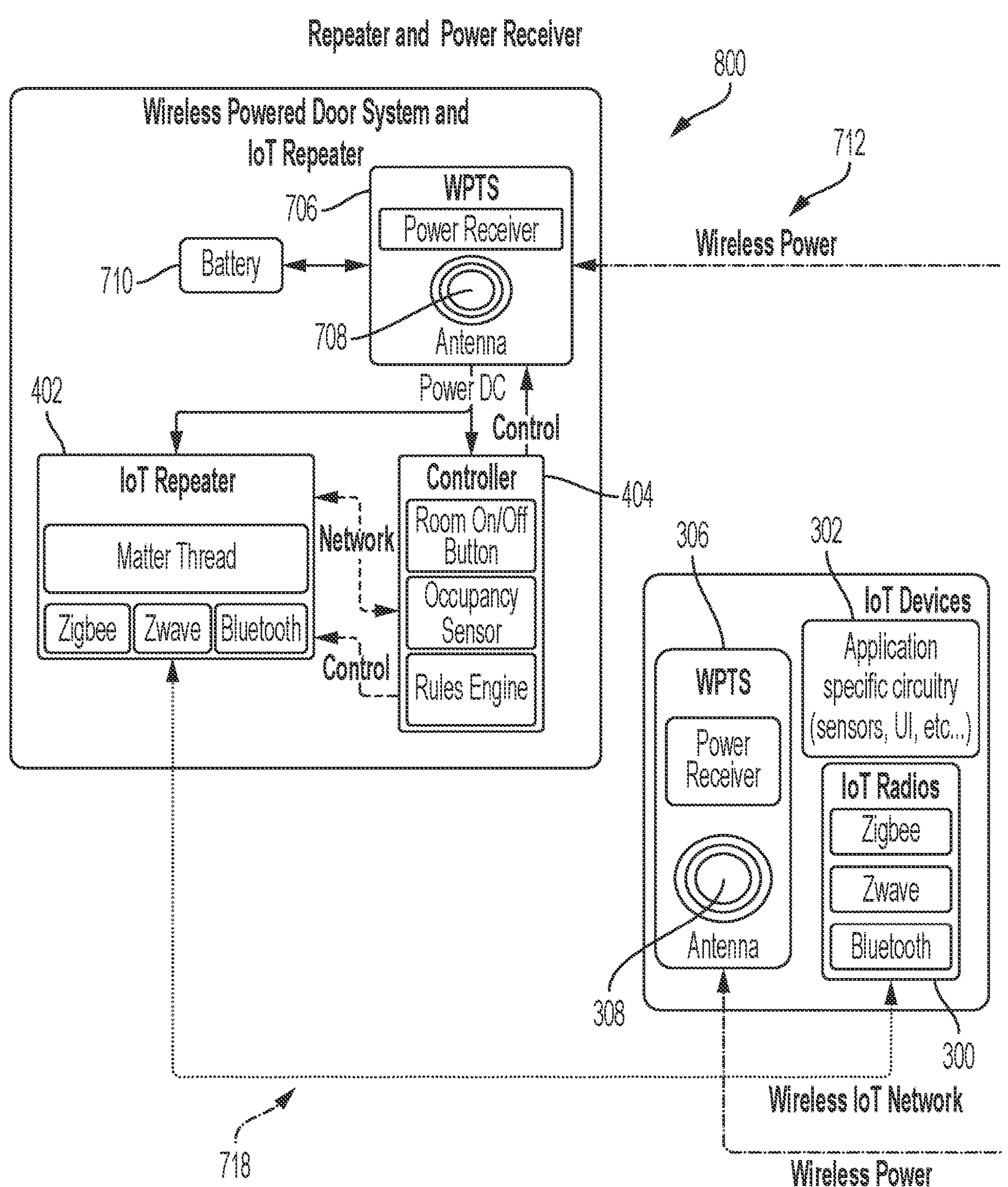
FIG. 8 is another flow diagram showing the details of the components of an exemplary repeater door and an exemplary IoT device and their communication and wireless power pathways according to exemplary embodiments of the present disclosure.

Alternatively, to having the power converters 200/400, WPTS transmitters 206/406, and transmitting antennas 208/408, the gateway and repeater doors may be configured to only receive wireless power and thus replacing these components with just a WPTS receiver and receiving antenna, like the IoT devices 102. For example, FIGS. 7 and 8 generally show additional exemplary gateway and repeater door configurations at 700 and at 800, respectively. In the illustrated exemplary embodiments of FIGS. 7 and 8, a WPTS receiver 706 and antenna 708 is provided on or within the door (e.g., between door skins) and wireless power being received generally at 712 at WPTS receiver 706. In FIG. 7, communication with a wireless IoT network is shown generally at 716 via IoT gateway 202. In FIG. 8, communication with a wireless IOT network is shown generally at 718 via IoT repeater 402 in FIG. 8. FIGS. 7 and 8 also show an internal (or door attached) battery at 710.

A door may also be equipped with both a WPTS transmitter and a WPTS receiver and their associated antennas, thus allowing them to "relay" wireless energy. Both gateway and repeater doors can be configured to relay wireless energy. These relay doors may also be configured to receive a different type of wireless energy than it relays. For example, the door may receive Infrared energy and relay (i.e., transmit) RF energy. Reference is made to copending U.S. patent application Ser. No. 17/951,737, filed Sep. 23, 2022, and entitled "Door Assembly Having Rechargeable Battery, Methods and System for Charging the Battery", the entire contents of which are incorporated by reference, for description of exemplary techniques and technology for wireless power transmission.

Figure 9:
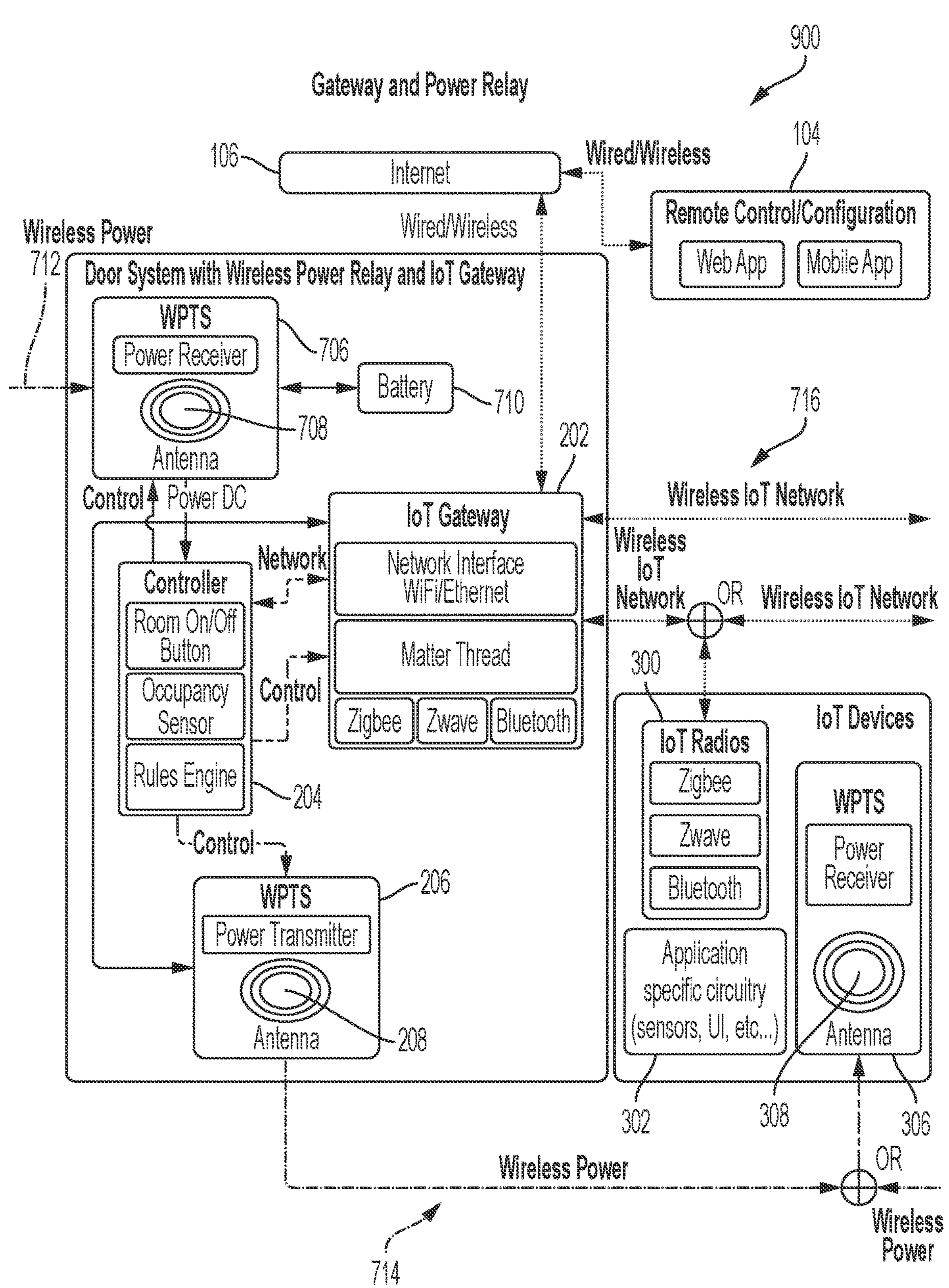
FIG. 9 is a flow diagram showing the details of the components of an exemplary gateway door and an exemplary IoT device and their communication and wireless power pathways according to exemplary embodiments of the present disclosure.
Figure 10:
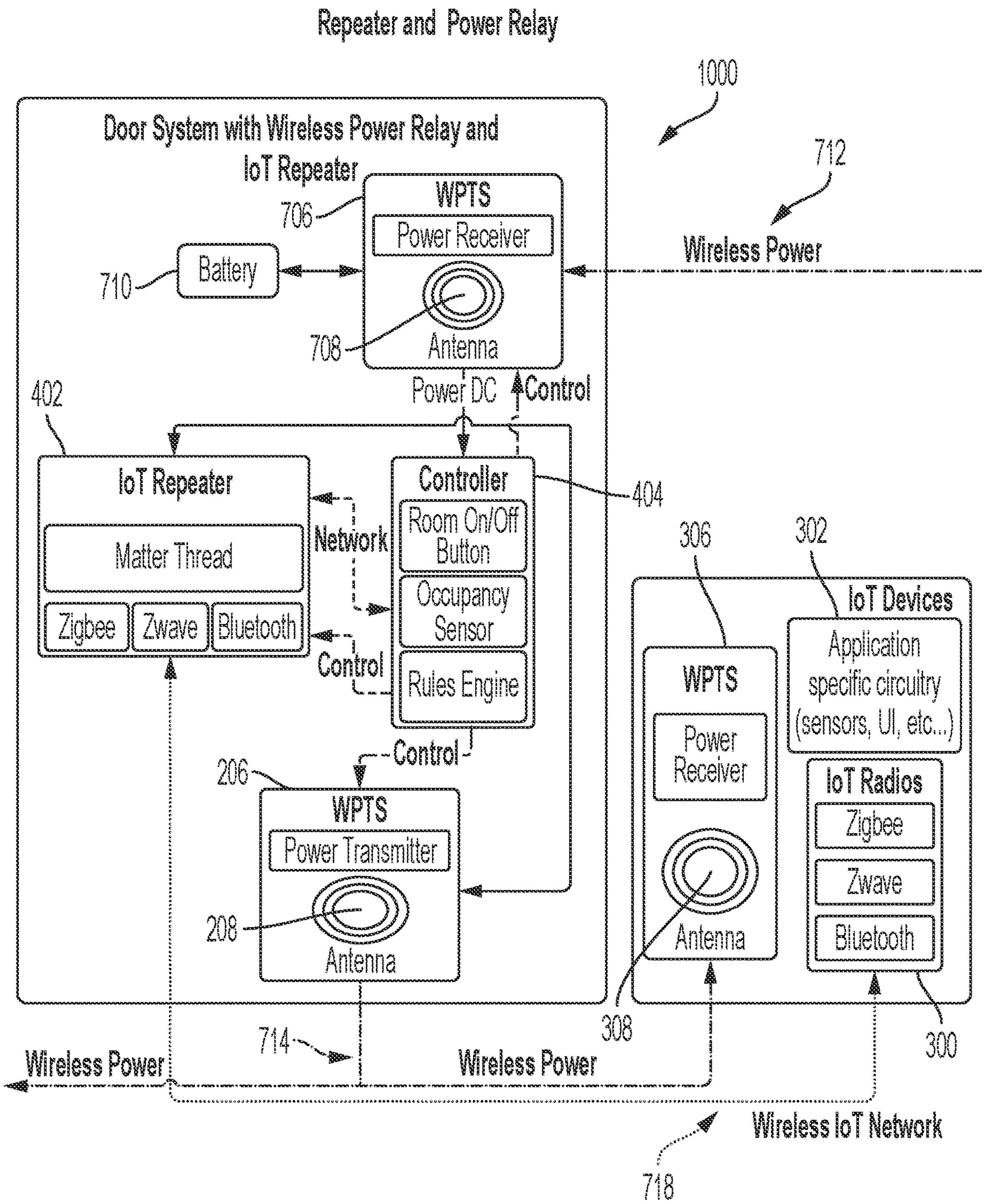
FIG. 10 is another flow diagram showing the details of the components of an exemplary repeater door and an exemplary IoT device and their communication and wireless power pathways according to exemplary embodiments of the present disclosure.

FIGS. 9 and 10 illustrate additional exemplary gateway and repeater door configurations at 900 and 1000, respectively, each showing receipt of wireless power and transmission of wireless power from a door. In the illustrated exemplary embodiments of FIGS. 9 and 10, a WPTS receiver 706 and antenna 708 is provided on or within the door (e.g., between door skins) and wireless power being received generally at 712 at WPTS receiver 706, with the addition of wireless power being transmitted generally at 714 via a WPTS transmitter 206 and antenna 208 provided on or within the door (e.g., between door skins). In FIG. 9, communication with a wireless IoT network is shown generally at 716 via IoT gateway 202. In FIG. 10, communication with a wireless IOT network is shown generally at 718 via IoT repeater 402 in FIG. 8. FIGS. 9 and 10 also show an internal (or door attached) battery at 710.

According to exemplary embodiments provided above, e.g., with reference to receipt of wireless power and transmission of wireless power from a door as in FIGS. 9 and 10, a "do it yourself" (DIY) system can comprise one or more doors easily installed and configured according to the needs of the installation. For example, an RF transmitter can send wireless power from a door to devices outside of IR line of sight; or if intended targets (either other door(s) or separate IoT devices) are all within line of sight of a particular transmitter, that transmitter can be installed to utilize an IR transmitter. Similarly, RF receiver(s) can be utilized for any transmission requirements that are not line of sight/appropriate for IR. Examples of this include, without limitation: an IR receiver and an IR transmitter in the same door, an IR receiver and an RF transmitter in the same door; an RF receiver and an IR transmitter in the same door; an RF receiver and an IR transmitter in the same door; or plural receivers and/or transmitters in the same door (any of which may operate in different mediums, e.g., IR and RF, etc.). Door(s) (and components of gateway or repeater doors) can thus be selected for an installation as desired to fulfill wireless power (and IoT network) needs specific to certain rooms or series of rooms.

In exemplary embodiments, the WPTS transmitter 206 converts power from the converter 200 to a time-varying electromagnetic field. The WPTS transmitter 206 and the WPTS receiver 306 on the IoT device 102 cooperate to transfer the time-varying electromagnetic field to the WPTS receiver 306 via the antennas 208 on the WPTS transmitter 206 and antenna 308 on the WPTS receiver 300, respectively. In turn, the WPTS receiver 306 receives the time-varying electromagnetic field and converts it to DC electric current to be used by the IoT device 102. Several techniques may be used to implement the WPTS: inductive coupling (transfer of electrical energy using electromagnetic induction between coils by a magnetic field); resonant inductive coupling (a form of the inductive coupling in which power is transferred by magnetic fields between two resonant circuits (tuned circuits), one in the transmitter and one in the receiver); capacitive coupling (transfer of electrical energy using electric fields for the transmission of electrical power between two electrodes (an anode and cathode) forming a capacitance for the transfer of power); magneto-dynamic coupling (transfer of electrical energy between two rotating armatures, one in the transmitter and one in the receiver, which rotate synchronously, coupled together by a magnetic field generated by magnets on the armatures); and microwaves (transfer of electrical energy via radio waves with short wavelengths of electromagnetic radiation, typically in a microwave range); light waves; or combinations thereof. In one technique the WPTS transmitter 206 generates a radio frequency (RF) power signal and transfers the RF power signal to the WPTS receiver 306 through the transmitting antenna 208 and the receiving antenna 308. The WPTS receiver 306 receives and converts (without limitation, e.g., 9 or more meters away from the transmitting antenna) the input RF power signal to an electric current to power the IoT device. As has been described herein, other contemplated technologies use of infrared (IR) technology that enables transmission, without limitation, of as much or more than 20 meters away from the transmitting source (or indeed at any distance having line of sight). In such a way, the role of a door (or window, etc.) itself can change from a traditional role to that of a source of wireless power.

The placement of the transmitting antenna 208 required for the WPTS transmitter 206 and IoT network 108 can vary. The transmitting antenna 208 may be placed in the jambs $12_1$ or $12_2$, doors 14, both the jamb and the door, or a combination of the two. Furthermore, the transmitting antenna 208 can be placed on both sides (interior and exterior) of a door 14 to provide greater range, increase overall system efficiency, and enhance performance. In exemplary embodiments, the transmitting antenna 208 is placed on the outside surface of the door 14 so that its transmission is not impeded. Usually, WPTS efficiency degrades when power is transferred through a physical medium (e.g., wall). Having the WPTS antennas on both sides of a door 14 eliminate the needs for power transfer through the physical medium to enhance WPTS efficiency. WPTS transmitter 206 may be place on the jamb $12_1$ or $12_2$, or inside the interior cavity 15 of the door 14.

Figure 3:
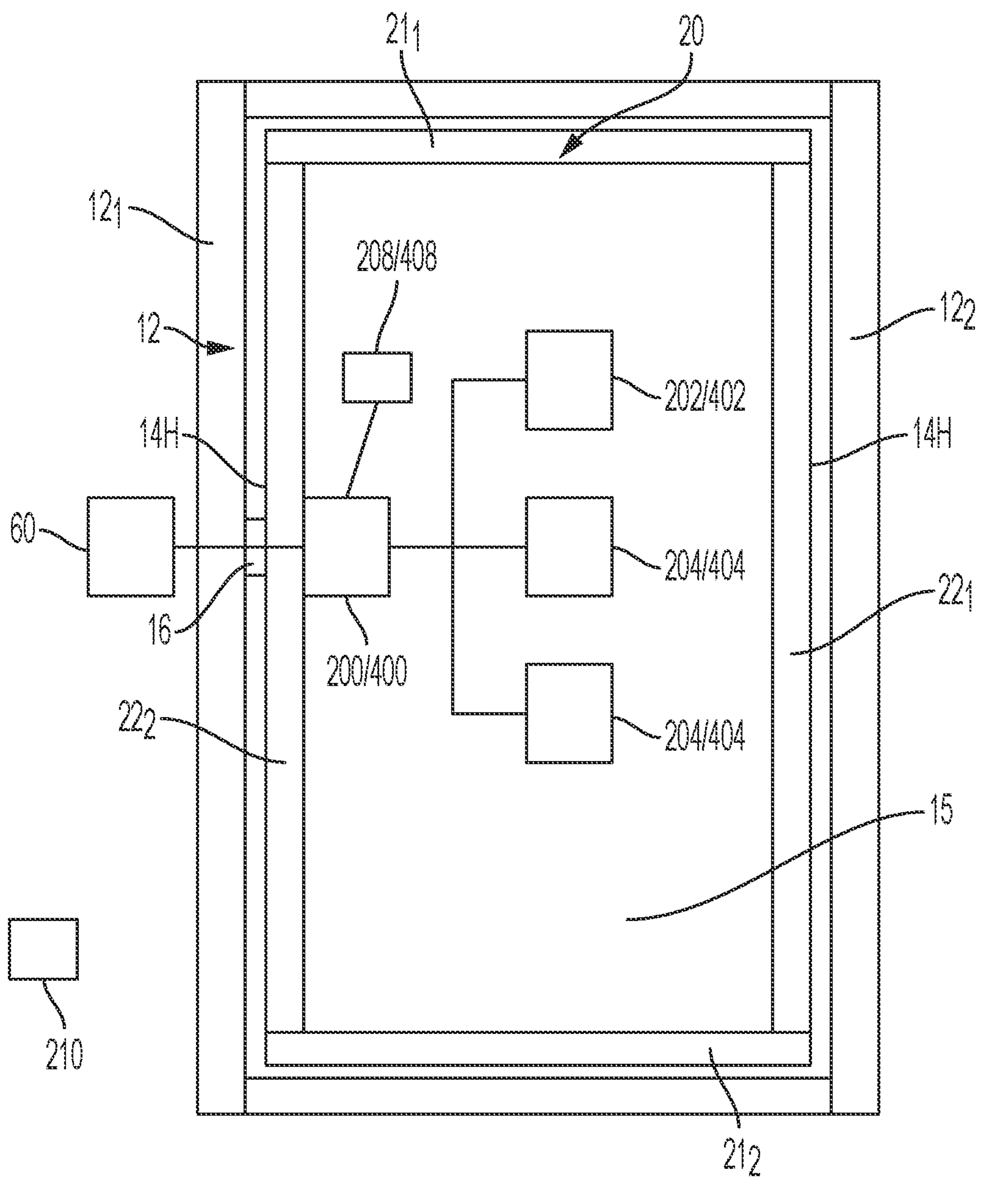
FIG. 3 is an elevational view of the door system the present invention without an exterior door skin in order to allow observation of the interior of the door.

With further reference to FIG. 3, one or more transmitting antennas 208/408 may also be provided in any given door transmitting wireless power. Similarly, if the door is equipped with a WPTS receiver 306, there may be one or more receiving antennas 308.

Doors configured to receive wireless power enable a "do-it-yourself" type retrofitting options for powered doors, as opposed to doors which need a wired power source which is a more complicated installation that typically requires a professional. In various exemplary embodiments described herein, consumers can simply remove old entryways and install one or more doors, and if applicable, plug in an external (i.e., not installed in a door) WPTS module(s)/transmitter(s).

As shown in FIG. 6, each repeater door $14_2$ may be identical to the gateway door $14_1$, except that the repeater door includes an IoT repeater 402 instead of the IoT gateway 202. The IoT repeater 402 communicates only over the IoT network 108, i.e., with the IoT devices, other repeater doors $\mathbf{14}_2$, $\mathbf{14}_3$, or the gateway door $\mathbf{14}_1$, but not directly to the Internet 106 (in some exemplary embodiments). The repeater door $\mathbf{14}_2$ connects to the Internet only through the gateway door $\mathbf{14}_1$. The repeater doors $\mathbf{14}_2$ may also include a power converter 400, a controller 404, and a WPTS transmitter 406 operably connected to a transmitter antenna 408, which are identical to the power converter 200, the controller 204, the WPTS transmitter 206, and the transmitter antenna 208, respectively, as described above.

In exemplary aspects, the IoT devices 102 are all similarly equipped to operate with the network system 100 of the present invention. Exemplary IoT devices $\mathbf{102}_1$, $\mathbf{102}_2$ are shown in FIGS. 5-6 and preferably are identical; therefore, only one IoT device is discussed herein and referred to generally with reference numeral 102. As shown in FIGS. 5-6, the IoT device 102 have the following components: the WPTS receiver 306, an IoT radio 300, and application specific circuitry 302. The application specific circuitry 302 is specific to the kind of IoT device 102 and is needed for the functionality of the IoT device 102. For example, a camera would have a different application specific circuitry 302 than an LED light. The WPTS receiver 306 is operably connected to the receiving antenna 308; and their operation is discussed above.

The IoT radio 300 wirelessly communicates with either IoT gateway 202 on the gateway door $\mathbf{14}_1$ or the IoT repeater 402 on the repeater door $\mathbf{14}_2$ or both. Communication via the IoT radio 300 forms part of the IoT network 108 (discussed above). Some IoT devices may not have the need for an IoT radio and may only have a WPTS receiver system, for example a TV that does not need to have any IoT connectivity but could still receive power wirelessly from the door.

The application specific circuitry 302 is specific to the particular IoT device 102. As noted above, the IoT device 102 may be lights, sensors, cameras, door operators, locks, computers, televisions, audio/video equipment for tele conferencing, heating/air conditioner units, fans, air purifier. The application specific circuitry 302 may include sensor(s), such as a motion sensor; user interface; actuators for controlling the IoT device 102; and any other circuitry necessary to operate the IoT device 102. The user interface provides a platform for indicating the status of the IoT device 102 and/or for the user to input information or instruction to the IoT device 102. The user interface may include display(s) or light(s), e.g., showing the status of the IoT device 102, and/or buttons, e.g., for a user to enter information or instruction to the IoT device 102.

Figure 11:
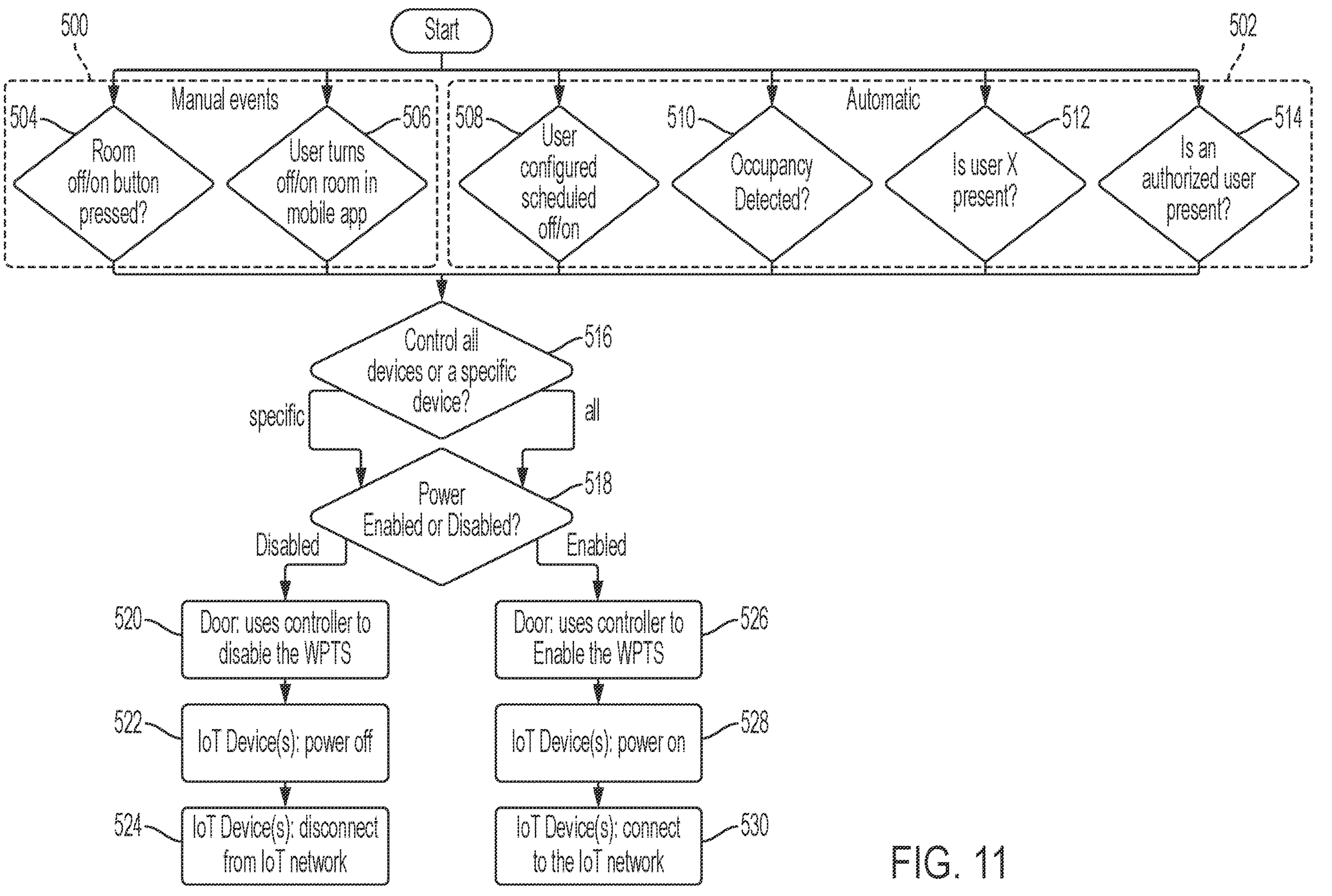
FIG. 11 is a flow chart showing operation of an exemplary system according to exemplary embodiments of the present disclosure.

Referring to FIG. 11, which illustrates an exemplary system 100, the system 100 operates either by manual user inputs (box 500) or by configurable automatic controls (box 502). Manual mode (box 500) allows users to turn the IoT devices 102 on/off by pressing a physical button (box 504), e.g., located on the door system or through an application on the remote device 104 (box 506). To use the remote device 104, the user may access the network system 100 from the remote device 104 through the internet 106. Additionally, if the remote device is equipped with an IoT radio then the remote device can be used to control when within range of the IoT network (example Bluetooth).

The automatic mode (box 502) may operate through one of the following triggers: a preconfigure schedule (box 508), detection of occupancy of a room (box 510), detection/presence of a particular user (box 512), or detection/presence of an authorized user (box 514). The automatic mode (box 502) may be achieved by using the IoT network 108. For example, Bluetooth can be used to detect when a user's phone is within close proximity to the particular IoT device 104. Alternatively, a key fob may be used and incorporated in the IoT network 108. Depending upon the trigger, certain IoT device(s) may be turned on or off based a particular trigger. The user may be classified into different classes of users. For example, class A users can get full use of all devices in any room, while class B users are limited to only certain devices in certain rooms. Here, depending on the user, only certain IoT devices 104 and certain rooms are available to turn on. Once in manual (box 500) or automatic (box 502) mode, the operation of the system 100 determines whether all or only specific IoT device(s) 102 must be controlled (box 516). That determination is either preconfigured (if in automatic mode) or depends upon manual entry by the user. The IoT device(s) 102 to be controlled are then identified as being enabled or disabled (box 518). If disabled, the controller 204 (on the gateway door $\mathbf{14}_1$) or 404 (on the repeater door $\mathbf{14}_2$) turns off the WPTS transmitter 206 or 406 to the disabled device(s) 102 (box 520), thereby turning off the device(s) 102 (box 522) and removing the device(s) 102 from the IoT network 108 (box 524). If enabled, the controller 204 or 404 turns on the WPTS transmitter 206 or 406 to the enabled device(s) 102 (box 526), thereby powering on the device(s) 102 (box 528) and allowing the IoT the device(s) 102 to connect to the IoT network 108 (box 530). When enabled, the controller 204 or 404 turns on the device(s) 102. When disabled, the controller 204 or 404 turns off the device(s) 102.

In certain embodiments, the manual (box 500) and automatic (box 502) modes may operate simultaneously. For example, manual mode (box 500) can be used to override the current state of one or more of the IoT devices 102. This can be configured to remain in this mode until a particular automatic trigger re-enables the devices, or to stay in the manual configured state until another manual event is used. Additionally, both the manual (box 500) and automatic (box 502) modes can be disabled for a particular door 14 or IoT device 102, which may be configured from the remote device 104.

Alternatively, if the IoT device 102 is equipped with a small battery, the IoT network 108 can be used to inform the IoT device 102 to enter/exit a low power mode. When entering low power mode, the IoT device 102 disables the WPTS receiver 306, thus, cutting off power from the door 14. In low power mode, the IoT device 102 remains connected to the IoT network 108 which allows the IoT device 102 to receive a signal from the door 14 to turn on its WPTS receiver 306 when triggered by an automatic (box 502) or manual (box 500) trigger. This enables the use of different architectures for implementing the WPTS functionality, while still conserving power when the IoT device 102 is not in use.

Since the doors 14 can control the power of IoT devices 102 in an area, the network system 100 be configured to only turn on the device(s) 102 if an authorized user is present. Therefore, if an unauthorized user finds his/her way into a secure area, he/she will not be able to use the IoT devices. An example may be an office of an executive. When the executive leaves the room, the computer's power is disabled, thus preventing anyone from access to sensitive information on that computer.

The present network system 100 provides several advantages over the prior art systems. First, a single gateway door $\mathbf{14}_1$ provides energy conservation. Here, several IoT devices 102 are connected to a single gateway door $\mathbf{14}_1$ which allows IoT devices 102 to connect to the internet. This way, the IoT devices connect wirelessly to the gateway over an IoT network, and then the gateway door $14_1$ bridges these IoT devices 102 to the internet. This system requires gateway door $14_1$ to have the network interface for connecting to the internet, which allows the IoT devices to be lower cost and consume less energy. Having the gateway embedded to an object that is already in the house, i.e., the door, also saves space and is more aesthetically pleasing.

Second, the network system 100 provides an efficient energy source for the IoT devices 102. Electrical outlets are not always easily accessible and having to recharge/change batteries is a nuisance for homeowners. By having the doors 14 provide wireless power to the IoT devices 102, the homeowners/businesses need not be concerned about how to reliably provide power to their IoT devices 102. Additionally, the door that provides the most efficient transfer of energy and/or connectivity to the IoT device(s) can be used which allows for efficient energy usage and connectivity.

Third, the present network system 100 provides improved energy management. In both commercial and residential applications, conserving energy saves money and is preferred for environmental conservation. However, having to manually control power to all the IoT devices (and other devices teleconferencing systems, projectors, lighting) when they're not needed is difficult to manage. A door 14, being located at the entryway to a building or a room, is an ideal location to control the devices manually or automatically within the room/building to conserve energy when that area is not in use. Instead of having to change a house/building's infrastructure (i.e., wiring) to accommodate the ability to manage the power of a room or building, only one or more doors 14 need to be installed to control the power to the IoT devices 102 inside the room/building.

Fourth, the present network system 100 provides advanced security features. Because the system 100 can control the power to the IoT devices 102 in an area, it can be configured to only turn on devices if an authorized user is present. An example is provided above for the executive office.

Fifth, the present network system 100 provides an ideal location for WPTS. Common WPTS requires a large antenna that is not ideal aesthetically and is not easy to install. Since there is a lot of space in the door 14, large antennas may be used to improve system performance and efficiency. The antennas can be placed on both sides (interior and exterior) of the door system allowing for greater range and overall system efficiency and performance. Furthermore, this would allow a single WPTS system to be used to power devices in two areas (both sides of the door 14) rather than a single area, thus saving costs. The IoT devices 102 can be manually configured to a specific room/area, thus still allowing the room to be completely turned off while still allowing for optimal performance (i.e., energy transfer and connectivity).

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof.

What is claimed is:

1. An entry device having a wireless component, comprising:

a door assembly comprising a door and a door frame, the door assembly having a plurality of wireless protocol components, wherein the plurality of wireless protocol components comprise: one or both of a wireless power transfer system (WPTS) transmitter configured to wirelessly transmit power and a WPTS receiver configured to receive wireless power from a WPTS power source;

at least two Internet of Things (IoT) devices, wherein the at least two Internet of Things (IoT) devices are integrated within the door and configured to wirelessly communicate with each other through the door; and a controller configured to automatically cause the WPTS transmitter to cease transmitting power to at least one IoT device from among the at least two IoT devices to automatically disable said at least one IoT device.

2. An entry device in accordance with claim 1, wherein at least one of the at least two IoT devices is an IoT gateway configured to provide Internet connectivity.

3. An entry device in accordance with claim 2, wherein at least one among the plurality of wireless protocol components comprises a WPTS transmitter component.

4. An entry device in accordance with claim 2, wherein at least one among the plurality of wireless protocol components comprises a WPTS receiver component.

5. An entry device in accordance with claim 2, wherein at least one among the plurality of wireless protocol components comprises a WPTS relay that includes both a WPTS receiver component that receives wireless power and a WPTS transmitter component that re-transmits wireless power.

6. An entry device in accordance with claim 1, wherein at least one of the at least two IoT devices comprises an IoT repeater configured to capture the signal of a wireless network and to retransmit such signal to extend coverage for the wireless network.

7. An entry device in accordance with claim 6, wherein at least one among the plurality of wireless protocol components comprises a WPTS transmitter component.

8. An entry device in accordance with claim 6, wherein at least one among the plurality of wireless protocol components comprises a WPTS receiver component.

9. An entry device in accordance with claim 6, wherein at least one among the plurality of wireless protocol components further comprises a WPTS relay that includes both a WPTS receiver component that receives wireless power and a WPTS transmitter component that re-transmits wireless power.

10. An entry device in accordance with claim 1, wherein at least one of the at least two IoT devices comprises an IoT extender configured to receive the signal of a wireless network, to amplify such signal and to transmit a boosted wireless network signal.

11. An entry device in accordance with claim 10, wherein at least one among the plurality of wireless protocol components further comprises a WPTS transmitter.

12. An entry device in accordance with claim 10, wherein at least one among the plurality of wireless protocol components further comprises a WPTS receiver.

13. An entry device in accordance with claim 10, wherein at least one among the plurality of wireless protocol components further comprises a WPTS relay that receives wireless power and re-transmits wireless power.

14. An entry device in accordance with claim 1, wherein a WPTS transmitter is configured to transmit power from the door assembly which has a wired connection to a power source.

15. An entry device in accordance with claim 1, wherein a WPTS transmitter is configured to transmit power from a battery.

16. An entry device in accordance with claim 1, wherein at least one among the plurality of wireless protocol components is disposed in or on the jamb of a door assembly.

17. An entry device in accordance with claim 16, wherein at least one among the plurality of wireless protocol components comprises a WPTS transmitter or receiver comprising an antenna housed at least partially within a hollow space in the jamb of a door assembly.

18. An entry device in accordance with claim 1, wherein at least one among the plurality of wireless protocol components is disposed in or on a door slab.

19. An entry device in accordance with claim 18, wherein among the plurality of wireless protocol components comprises a WPTS transmitter or receiver comprising an antenna housed at least partially within a hollow space in the door slab.

20. An entry device in accordance with claim 19, wherein the antenna is provided between front and rear door skins of a door slab.

21. An entry device in accordance with claim 1, wherein the at least one wireless component comprises a WPTS transmitter, receiver or relay that operates according to a RF protocol.

22. An entry device in accordance with claim 1, wherein the at least one wireless component comprises a WPTS transmitter, receiver or relay that operates according to an IR protocol.

23. An entry device in accordance with claim 1, wherein the door assembly includes at least three Internet of things (IoT) electrical devices.

24. An entry device in accordance with claim 23, wherein the door or door assembly includes a rechargeable battery.

25. An entry device in accordance with claim 1, wherein the door assembly is configured to wirelessly receive energy in a first source medium and to transmit energy in a second source medium.

26. An entry device in accordance with claim 25, wherein either of the first and second source mediums are IR or RF source mediums.

27. An entry device in accordance with claim 1, wherein the door assembly is configured to wirelessly receive energy and to transmit energy in the same source medium, and wherein that source medium is an IR or RF source medium.

28. An entry device in accordance with claim 1, wherein the door comprises a door slab that further comprises front and back door skins or facings attached to or part of a door frame, and at least one hinge or hanging rail attachment.

29. An entry device in accordance with claim 1, wherein a WPTS receiver provides power to plural IoT devices.

30. An entry device in accordance with claim 1, wherein at least one among the plurality of wireless protocol components operates according to an RF or IR protocol.

31. An entry device in accordance with claim 1, further comprising one or more sensors positioned in or on the door assembly, wherein the controller is further configured to communicate with the one or more sensors and automatically cause the WPTS transmitter to cease transmitting power to the at least one IoT device responsive to sensed data detected by the one or more sensors.

* * * * *